UNITED STATES PATENT OFFICE.

HENRY CLAY MILLER, OF SAN FRANCISCO, CALIFORNIA.

IMPROVEMENT IN INSECT-DESTROYING COMPOUNDS.

Specification forming part of Letters Patent No. 149,054, dated March 31, 1874; application filed October 17, 1873.

*To all whom it may concern:*

Be it known that I, HENRY CLAY MILLER, of San Francisco, in the county of San Francisco and State of California, have invented an Improved Compound for Exterminating Rodents and other small Animals; and I do hereby declare that the ingredients used and the manner of mixing or compounding them to make the said exterminator, together with the manner of using the same, are described in the following specification:

Heretofore great difficulty has been encountered in inducing animals to eat food prepared with poison; and more especially is this the case with the smaller animals, known as the "gopher and ground-squirrel species."

The object of my invention, then, is mainly to so combine with that deadly poison known as strychnine ingredients that will at once render it attractive to the sense of the animal that it is intended to exterminate, and impel him to partake of the poison through the medium in which it is to be conveyed.

To accomplish this, I employ the following formula, to wit: Crystals of strychnine, one ounce; acetic acid, eight ounces; oil of rhodium, one-half dram; oil of anise, one dram; water, eight ounces. Dissolve the strychnine in the acetic acid, and then add the other ingredients. I then soak or saturate wheat, or other food or seeds, in this preparation, and scatter it in the holes or places where the animals frequent.

When it is desired to economize—as in preparing a considerable quantity of the poisonous food—the solution may be diluted by adding to the above fifty per cent. or one-half water.

It should here be observed that arsenic might be employed; but as the action of this poison is slower than that of strychnine, I prefer the latter.

Having thus described my invention, what I claim as new, and desire to secure by Letters Patent, is—

The within-described ingredients, mixed or compounded in about the manner and proportions herein specified, for the purpose set forth.

In witness whereof I have hereunto set my hand and seal.

H. CLAY MILLER. [L. S.]

Witnesses:
C. W. M. SMITH,
O. C. MILLER.